Patented June 22, 1943

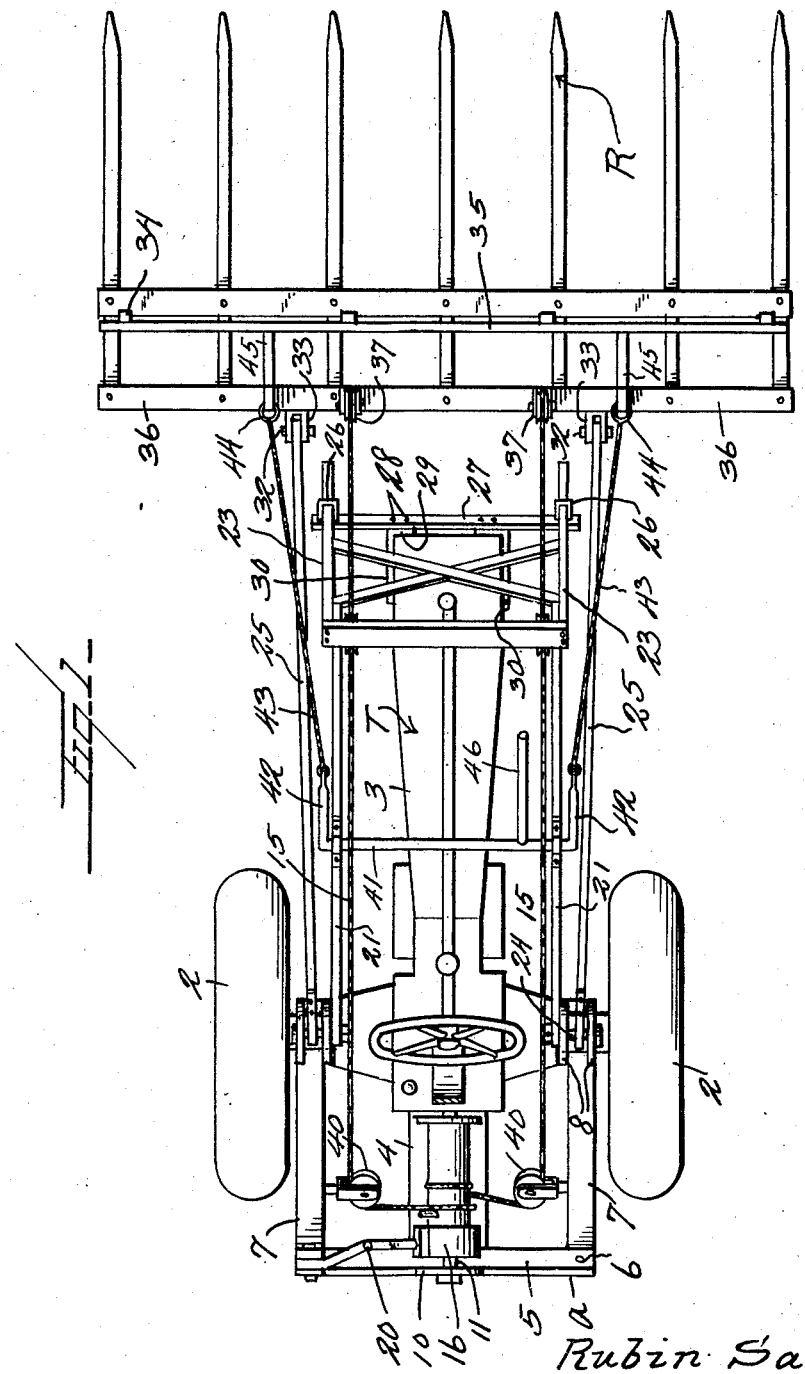

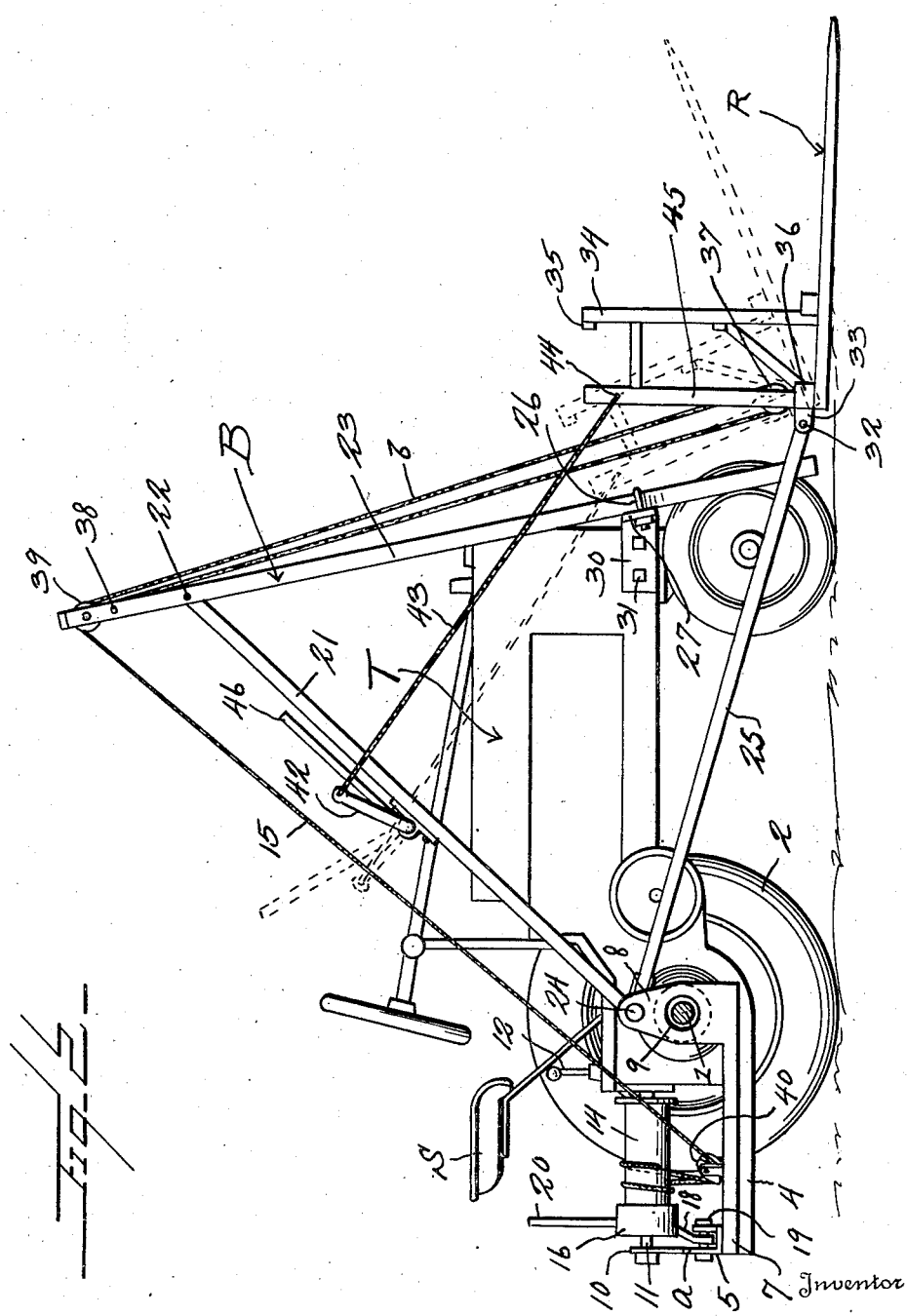

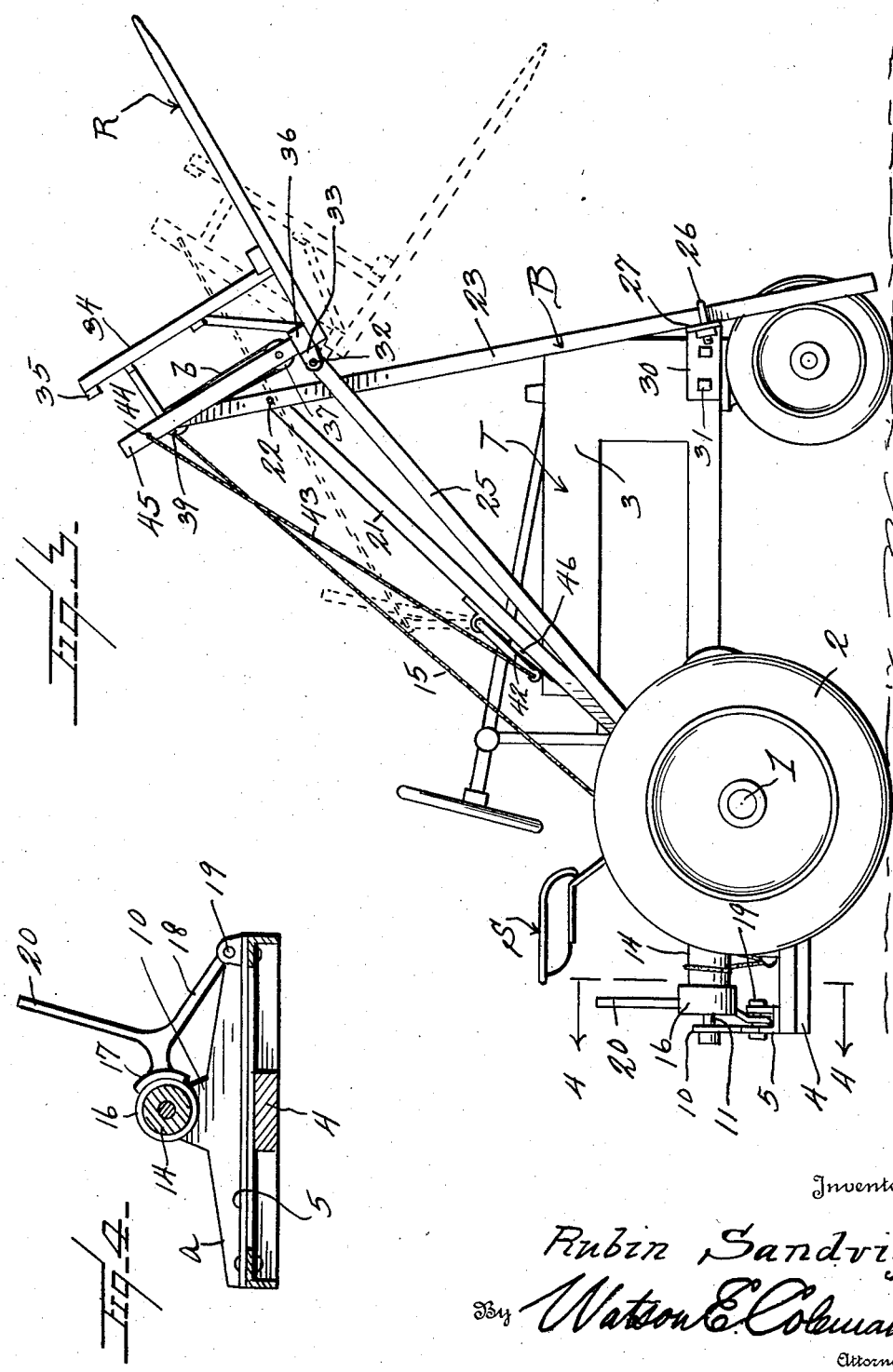

2,322,472

UNITED STATES PATENT OFFICE 2,322,472

COMBINED POWER HAY BUCKER AND STACKER

Rubin Sandvig, Brooten, Minn.

Application August 2, 1941, Serial No. 405,234

3 Claims. (Cl. 214—140)

This invention relates to a combined power hay bucker and stacker and it is an object of the invention to provide a device of this kind including a sweep which is raised by power under control of an operator and wherein the sweep may be manually tilted, as desired.

Another object of the invention is to provide a combined power hay bucker and stacker which is adapted to be mounted upon a tractor and wherein the sweep is so positioned with respect to the tractor to be effectively employed as a buck rake and wherein the sweep is so mounted as to be raised by power of the tractor when it is desired to use the apparatus as a stacker.

The invention consists in the details of construction and in the combination and arrangement of the several parts of my improved hay bucker and stacker whereby certain important advantages are attained, as will be hereinafter more fully set forth.

In order that my invention may be the better understood, I will now proceed to describe the same with reference to the accompanying drawings, wherein:

Fig. 1 is a view in top plan illustrating a combined power hay bucker and stacker constructed in accordance with an embodiment of my invention and mounted upon a tractor, the upper portion of the seat structure being omitted.

Fig. 2 is a view in side elevation of the structure as illustrated in Fig. 1, with a part of the tractor in section and a second position of certain of the parts indicated by broken lines.

Fig. 3 is a view somewhat similar to Fig. 2 but showing the sweep in an elevated position, a second or dumping position of the elevated sweep being indicated by broken lines.

Fig. 4 is an enlarged fragmentary sectional view taken substantially on the line 4—4 of Fig. 1.

As disclosed in the accompanying drawings, T denotes a tractor of any desired type or model, which is provided at its rear portion with a seat S for the operator. The tractor also includes a rear driven shaft 1 carrying the drive wheels 2. The rear body portion of the body 3 of the tractor has rigidly secured thereto a rearwardly directed platform 4 of any suitable construction. This platform 4 in the present embodiment of the invention is relatively narrow and to the outer or free end portion thereof is secured the central portion of a transversely disposed bar 5 herein disclosed as an angle bar. This bar 5 extends a material distance beyond opposite sides of the platform 4 and secured to each outer end portion of this bar 5, as at 6, is an end portion of a side bar 7. This side bar 7 is of a length to extend below the rear axle 1 and said underlying portion of bar 7 is provided with the upstanding space plates 8 through which is directed the adjacent end portion of the housing 9 for said axle 1.

The bars 7 serve to maintain the bar 5 in a rigid position.

A flange a of the bar 5 is upwardly disposed and the central portion of this flange a is formed to provide on upstanding bearing plate 10 to provide a mounting for one end portion of a shaft 11, which is in driven connection with the power take-off of the tractor T or other driven part. The operation of the shaft 11 is through a conventional transmission under control of a conventional hand lever 12 positioned in close proximity to the seat S for the operator, so that the desired operation of the shaft 11 may be readily effected by the operator without requiring him to leave the seat S.

Fixed to rotate with the shaft 11 is a drum 14 around which wind the flexible cables 15 to be hereinafter more particularly referred to.

One end portion of the drum 14 is provided with a surrounding brake drum 16 with which coacts a brake shoe 17 carried by an end portion of a rock arm 18. The opposite end portion of this rock arm 18, as herein disclosed, is pivotally connected, as at 19, with an end portion of the cross member 5. The arm 18 has rigid therewith an upstanding lever 20 which is also closely adjacent to the seat S, so that the braking action of the shoe 17 upon the brake drum 16 may be readily and conveniently controlled by the occupant of the seat S. The plates 8 of each of the side bars 7 are the length to extend a desired distance above the axle 1 or the adjacent portion of the housing 9, and extending from the upper portion of a plate 8 is a rigid brace member 21. This member 21 is of desired length and extends upwardly and forwardly on a predetermined incline and has its upper extremity suitably anchored, as at 22, to one of the uprights 23 of a boom frame B.

The lower end portion of each of the brace members 21 is secured to a plate 8 by a pin 24 which bridges the space between the plates 8. This pin 24 also serves as a pivotal mounting for the lower end portion of a sweep rake beam 25 to be hereinafter more particularly referred to.

The uprights 23 each has its lower portion disposed forwardly of the body 3 of the tractor T and clamped by a U-bolt 26 or otherwise, as may be preferred, to the end portion of a front cross bar 27. This cross bar 27 is rigidly secured, as at 28, to the inwardly disposed flanges 29 carried by the plates 30 bolted or otherwise rigidly secured, as at 31, to the side faces of the body 3 of the tractor T at the forward end thereof. The clamping means 26 for each of the uprights 23 permit a selective vertical adjustment of the boom frame B, as may be desired in mounting the apparatus upon the tractor T.

Each of the beams 25 is of a length to terminate in advance of the boom frame B in all positions of the beam 21. The outer or forward end portion of the beam 25 is pivotally connected, as at 32, to a rearwardly disposed bracket 33 carried by the rear portion of the sweep rake R to one side of the tractor T. This sweep rake R is of a conventional type and includes the back structure comprising the upstanding posts 34 to which are secured the cross members 35. The rake structure R behind the back structure is provided with a cross member 36 and upon the central portion of this cross member 36 are mounted the pulleys 37 spaced apart a suitable distance lengthwise of the member 36. Engaging each of the pulleys 37 from below is a flexible member or cable 15, one end portion of which is suitably anchored, as at 38, to the upper portion of an adjacent upright 23 comprised in the boom frame B. A second stretch b of each of the cables 15 passes over a pulley 39 carried by the upper portion of the adjacent upright 23 and then is continued downwardly to the pulley 14 being properly guided in its course by a suitably positioned pulley 40 carried by the side bar 7. The mounting of the sweep rake S with respect to the forward end portions of the beam 25 is such as to allow the same to be readily tilted to facilitate the use of the apparatus in the stacking of hay, as indicated by broken lines in Figs. 2 and 3 of the drawings or to maintain its effective lowered position, as illustrated in Fig. 2, when the sweep S is to be used as a buck rake. The forward travel of the tractor T permits the lowered rake S to serve as a buck and after being loaded, the rake S is tilted rearwardly and upwardly, as indicated by dotted lines in Fig. 2, whereupon upon proper manipulation of the lever 12, the drum 14 is caused to rotate in a direction to raise the loaded rake S under the action of the flexible members or cables 15. After the rake S has been raised, as desired, the rake S is allowed to tilt downwardly, as indicated by broken lines in Fig. 3, to effect the desired dumping.

In the present embodiment of my invention, the brace members 21 at a desired point intermediate their ends have operatively engaged therewith a rock shaft 41 bridging the space therebetween. The end portions of the shaft 41 are provided with the angularly related and substantially parallel rock arms 42. Connected to each of these rock arms 42 are end portions of a flexible member or cable 43 having their opposite end portions suitably connected, as at 44, with the upper end portions of the suitably positioned posts 45 carried by the rear cross member 36 of the sweep rake R. The shaft 41 is also provided with an upstanding operating handle 46 so positioned as to be conveniently reached and operated by the occupant of the seat S. Normally the sweep S is in its lowered position, as indicated by full lines, but in Fig. 2, when it is desired to tilt or raise the same, it is only necessary for the operator to impose pull upon the handle 46, as illustrated by broken lines in Fig. 2, and when the rake S has reached its desired raised position and it is desired to dump the rake, it is only necessary that the operator release the handle member 46, whereupon the rake will drop downwardly into dumping position, as indicated by broken lines in Fig. 3.

The rake S is held in its desired raised position by proper application of the brake shoe 17 and the descent of the rake R can be readily controlled by the operator through proper working of the handle 20.

From the foregoing description, it is thought to be obvious that a combined power hay bucker and stacker constructed in accordance with my invention is particularly well adapted for use by reason of the convenience and facility with which it may be assembled and operated.

What is claimed is:

1. A combined power hay bucker and stacker comprising a platform for rigid connection with the rear portion of the body of a tractor to extend rearwardly from the tractor, a transversely disposed member carried by the outer end portion of the platform and extending beyond opposite sides thereof, side arms secured to the extremities of the cross member, said arms being of a length to underlie the housing for the rear axle of the tractor, upstanding plates carried by the portions of said arms underlying the housing and through which the housing is disposed, a boom frame for mounting upon the forward portion of the tractor, means for securing said boom frame to the forward portion of the tractor, said means being so constructed and arranged to permit up and down adjustment of the frame with respect to the tractor, sweep rake beams pivotally engaged with the upstanding plates of the arms, said beams being of a length to extend in advance of the boom frame mounted upon the forward portion of the tractor, a sweep rake in advance of the boom frame, the forward end portions of the beams being pivotally connected with the sweep rake, a winding drum mounted upon the platform and for driven connection with a driving part of the tractor, and flexible members winding upon the drum and guided over the upper portion of the boom frame and operatively engaged with the sweep rake, winding of the flexible members upon the drum raising the sweep rake.

2. A combined power hay bucker and stacker comprising a platform for rigid connection with the rear portion of the body of a tractor to extend rearwardly from the tractor, a transversely disposed member carried by the outer end portion of the platform and extending beyond opposite sides thereof, side arms secured to the extremities of the cross member, said arms being of a length to underlie the housing for the rear axle of the tractor, a pair of spaced and upstanding plates carried by the portion of each of said arms underlying the housing and through which the housing is disposed, a boom frame for mounting upon the forward portion of the tractor, means for securing said boom frame to the forward portion of the tractor, said means being so constructed and arranged to permit up and down adjustment of the frame with respect to the tractor, sweep rake beams, each of said beams being pivotally engaged between the upstanding plates of one of the arms, said beams being of a length to extend in advance of the boom frame mounted upon the forward portion of the tractor, a sweep rake in advance of the boom frame, the forward end portions of the beams being pivotally connected with the sweep rake, a winding drum mounted upon the platform and for driven connection with a driving part of the tractor, flexible members winding upon the drum and guided over the upper portion of the boom frame and operatively engaged with the sweep rake, winding of the flexible members upon the drum raising the sweep rake, and means for tilting the sweep rake independently of the swinging movement of the sweep rake beams.

3. A combined power hay bucker and stacker comprising a platform for rigid connection with the rear portion of the body of a tractor to extend rearwardly from the tractor, a transversely disposed member carried by the outer end portion of the platform and extending beyond opposite sides thereof, side arms secured to the extremities of the cross member, said arms being of a length to underlie the housing for the rear axle of the tractor, upstanding plates carried by the portions of said arms underlying the housing and through which the housing is disposed, a boom frame for mounting upon the forward portion of the tractor, means for securing said boom frame to the forward portion of the tractor, said means being so constructed and arranged to permit up and down adjustment of the frame with respect to the tractor, sweep rake beams pivotally engaged with the upstanding plates of the arms, said beams being of a length to extend in advance of the boom frame mounted upon the forward portion of the tractor, a sweep rake in advance of the boom frame, the forward end portions of the beams being pivotally connected with the sweep rake, a winding drum mounted upon the platform and for driven connection with a driving part of the tractor, flexible members winding upon the drum and guided over the upper portion of the boom frame and operatively engaged with the sweep rake, winding of the flexible members upon the drum raising the sweep rake, and a braking means for the drum carried by the cross member.

RUBIN SANDVIG.